United States Patent [19]

Grund et al.

[11] Patent Number: 5,681,476

[45] Date of Patent: Oct. 28, 1997

[54] PROCESS FOR THE PURIFICATION OF GROUNDWATER

[75] Inventors: Gerda Grund; John Kahsnitz, both of Haltern, Germany

[73] Assignee: Huels Aktiengesellschaft, Marl, Germany

[21] Appl. No.: 529,627

[22] Filed: Sep. 18, 1995

[30] Foreign Application Priority Data

Sep. 17, 1994 [DE] Germany ............... 44 33 225.4

[51] Int. Cl.⁶ ............................................. C02F 1/28
[52] U.S. Cl. ..................... 210/669; 210/673; 210/692; 210/909
[58] Field of Search .......................... 210/669, 671, 210/673, 692, 693, 908, 909, 924

[56] References Cited

U.S. PATENT DOCUMENTS

| | | | |
|---|---|---|---|
| 3,275,548 | 9/1966 | Walters | 210/692 |
| 3,520,806 | 7/1970 | Haigh | 210/692 |
| 3,531,463 | 9/1970 | Gustafson | 210/692 |
| 3,985,648 | 10/1976 | Casolo | 210/669 |
| 4,042,498 | 8/1977 | Kennedy | 210/909 |

FOREIGN PATENT DOCUMENTS

| | | |
|---|---|---|
| 392632 | 5/1991 | Austria . |
| 249190 | 9/1987 | Germany . |
| 4 204573 | 8/1993 | Germany . |

*Primary Examiner*—Ivars Cintins
*Attorney, Agent, or Firm*—Oblon, Spivak, McClelland, Maier & Neustadt, P.C.

[57] ABSTRACT

Polluted groundwater is purified by separating off solids and adsorbing dissolved organic compounds to an adsorber resin. The adsorbed organic compounds are desorbed using steam and the adsorber resin is regenerated using an acid and an oxygen-containing gas. The process makes it possible to separate aromatic and halogenated hydrocarbons off of heavily polluted groundwater to the extent that the groundwater can be added to flowing surface water without reservation. The purified water can, if appropriate, be used as cooling water, or after further biological purification, as drinking water.

4 Claims, 1 Drawing Sheet

PROCESS FOR THE PURIFICATION OF GROUNDWATER

BACKGROUND OF THE INVENTION

1. Field of the Invention

The present invention relates to a novel process for the purification of water, preferably groundwater. In one embodiment the invention method purifies groundwater by separating off organic compounds.

2. Discussion of the Background

Increasingly, alarming reports are appearing regarding the contamination of groundwater and drinking water by organic constituents, in particular by chlorinated solvents. Unfortunately, however, little is known on the cleaning up of groundwater.

In contrast, a plurality of methods are available for the purification of waste water or of industrial process water. These methods are concerned, however, with the reduction of pollutant concentrations which are orders of magnitude higher than those encountered in typical groundwater pollution and typically allow for relatively high levels of pollutants even in the treated product. The aim generally is to discharge water in an environmentally acceptable manner or to reuse it, and there is no intention of cleaning up drinking water or providing drinking water. Some of these methods are described below.

In "Neuere Verfahrenstechnologien in der Abwasserreinigung, Abwasser- und Gewässerhygiene", (Modern Processing Technologies in Waste Water Purification and in Waste Water and Water Body Hygiene], R. Oldenbourg Verlag, Munich, Vienna 1984, incorporated herein by reference, a plurality of methods are described on pages 235 to 251 for treating chlorinated-hydrocarbon-containing waste water from chlorination plants. In one process, the waste water is first made alkaline (pH 11). Subsequent stripping, which is carried out by blowing in steam in a countercurrent column, producing a distillate which, after condensation, divides into a chlorinated hydrocarbon phase and an aqueous phase. At the bottom of the stripper waste water appears which is subsequently purified biologically.

In special cases, waste water having a pH of 1 to 2 can also be subjected to stripping with steam in countercurrent. At the bottom of this stripper there appears water having a high iron and hydrochloric acid content which is fed to a chemical and mechanical clarification plant for further clean up.

Chlorinated-hydrocarbon-containing mining waste water is typically purified in an adsorber resin unit. Mining waste water, after it has been thoroughly freed of solids, is passed through an adsorber resin based on a divinyl benzene/styrene copolymer. Steam desorption is carried out for reactivation. Since a considerable decrease in activity after one year was noted with this method owing to irreversible iron deposition, a new unit was operated at pH 1.5.

According to Technische Mitteilungen 77 (1984), 525–526, styrene copolymers or polyacrylic esters are suitable for removing aliphatic and aromatic hydrocarbons, chlorinated hydrocarbons, phenols, pesticides and detergents from waste waters. The resin is subsequently regenerated with steam. However, in the case of pesticides, regeneration is effected by solvents, such as acetone or methanol or by inorganic chemicals.

In DD 249 190, hydrochloric acid which originates from chlorination processes and is contaminated by organic substances is purified using hydrophilic post-crosslinked divinyl benzene/styrene copolymers which preferably have an internal surface area of 1000 to 1600 m$^2$/g. The resin is regenerated in this case by steam at 130° C., the desorption of the bound organic substances also being able to be carried out by solvents, such as alcohols and ketones.

The purification processes specified above achieve concentrations with respect to individual pollutant components of <0.1 mg/l. However, the total amount of organic constituents or chlorinated hydrocarbons after purification is at best in the region of a few mg/l or ppm.

OBJECTS OF THE PRESENT INVENTION

One object of the present invention is to provide a method which will purify polluted or heavily polluted water, including groundwater, so that it can be added without reservation to flowing surface waters. The purified water obtained by this method would be useful as cooling water or for steam generation and, if necessary and after biological purification, also for drinking water.

Another object of the present invention is the purification of polluted water such that the contents of aromatic hydrocarbons are decreased to below 50 µg/l and the contents of halogenated hydrocarbons are decreased to below 100 µg/l.

DETAILED DESCRIPTION OF THE INVENTION

Figure 1:
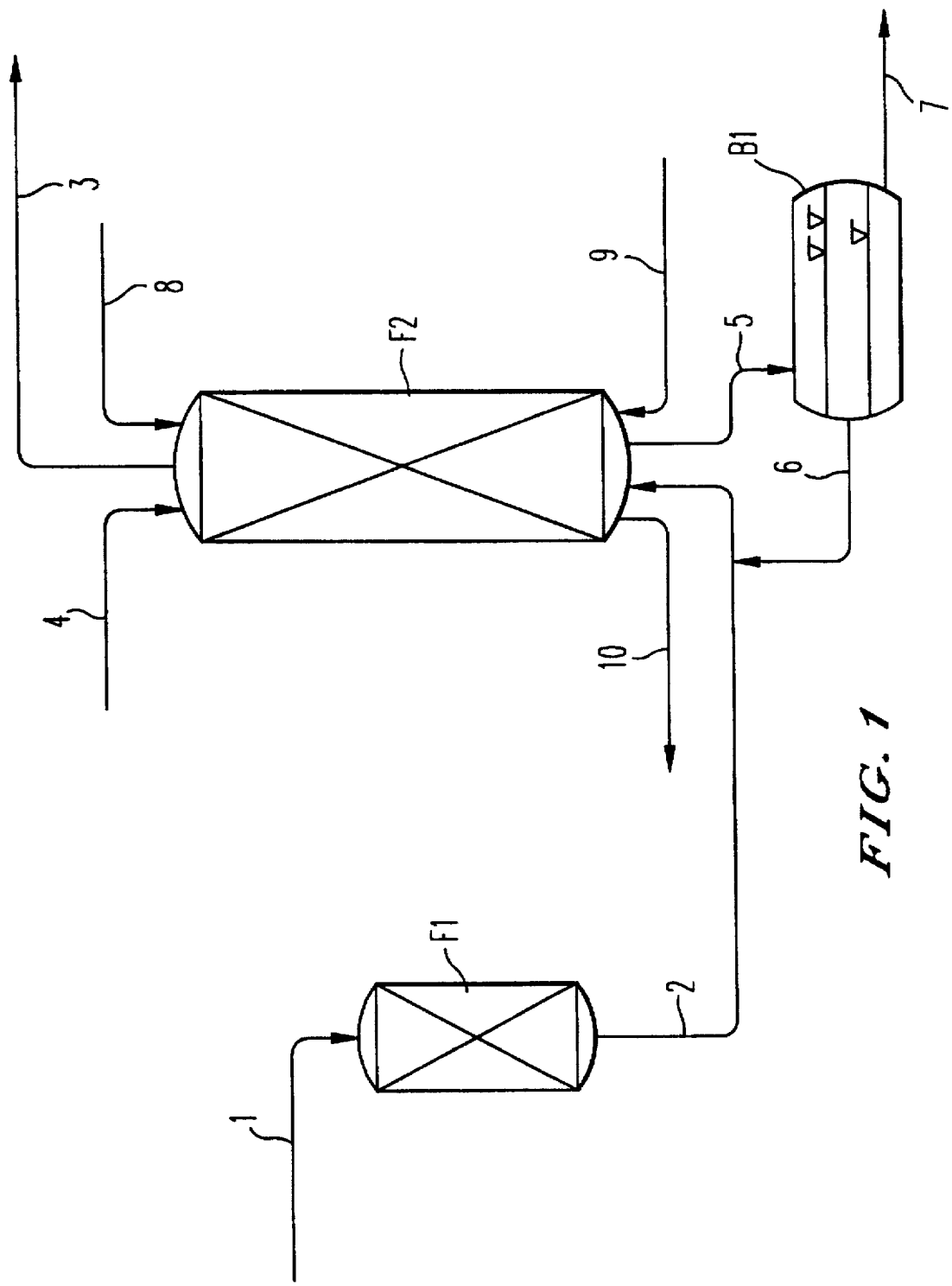
FIG. 1 shows an embodiment of the inventive process herein, exemplified in Example 1.

These and other objects are achieved according to the present invention by a method wherein solid constituents in polluted water are carefully separated off, and dissolved organic compounds are adsorbed by an adsorber resin. The adsorbed organic compounds may then be desorbed by steam and the adsorber resin regenerated using an acid.

It is interesting to note that the above objects are not attained by stripping or by oxidation using H$_2$O$_2$ with UV irradiation, but that decreasing the organic constituents in groundwater surprisingly occurs by the process according to the invention. In view of known results in the purification of industrial waste waters and of hydrochloric acid it is surprising that the content of organic substances in groundwater can be decreased by the invention process to values lower by 2 to 3 powers of 10 than in known processes.

In the present invention solid constituents, especially suspended matter, are generally separated off by filtration. Filters generally, including sand filters especially, and also cloth filters and paper filters, are suitable for this. The water to be purified can be left at its original pH during adsorptive purification. The pH of the water to be purified is preferably at 1 to 8, pHs of 3 to 7.5 being particularly preferred.

Organic compounds which may be contained in the polluted water to be purified by the invention method, preferably polluted groundwater to be treated, include aliphatic C$_4$ to C$_{12}$ hydrocarbons, such as pentane, hexane, cyclohexane, octane, isooctane or decane, aromatic hydrocarbons such as benzene, toluene or xylene, phenols, organic acids and halogenated hydrocarbons. Halogenated hydrocarbons include chlorinated hydrocarbons, such as chloroform, carbon tetrachloride, 1,2-dichloroethane or 1,2-dichloropropane, brominated hydrocarbons, such as bromochloromethane, bromoform or bromobenzene, and chlorofluorocarbons, such as trifluorochloromethane.

Suitable adsorber resins useful in the present invention method for adsorbing dissolved organic compounds are, especially, divinyl benzene/styrene copolymers, which preferably have a specific surface area of 600 to 1200 $m^2/g$ and, in particular, of 700 to 900 $m^2/g$. Other polymers which can adsorb neutral organic compounds can also be used. Adsorption is preferably effected in the present invention at 15° to 35° C. Desorption using steam is generally preferably carried out at 100° to 150° C. In order to protect the adsorptive resin, temperatures of 110° to 140° C. are generally used.

In the case of the claimed adsorptive purification of water having an unadjusted pH, deposits on the resin may occur. These mostly inorganic deposits are removed at regular intervals. Acids which can be used for the removal and regeneration of the adsorber resin include mineral acids such as hydrochloric acid, sulphuric acid and phosphoric acid. However, strong organic acids such as formic acid and acetic acid can also be used. Preferably, a 10 to 20 wt. % strength solution of hydrochloric acid is used and regeneration is carried out at 20° to 80° C. An oxygen-containing gas, preferably air, may be introduced in counter current if desired, particularly with the HCl. Regeneration is not necessary after each adsorption/desorption cycle, but only when the adsorption capacity of the resin decreases. When regeneration is performed in the invention method it is generally done so after 30 to 80 cycles, regeneration needing to be performed less frequently in the case of acidic water than with neutral water.

If the water to be purified in the present invention flows through the adsorber resin in a column, for example, from bottom to top, the steam for desorption is preferably added in countercurrent, that is, from top to bottom. During regeneration, the oxygen-containing gas may be introduced beneath the resin layer.

In the present invention, organic constituents present in amounts of, for example, 200 mg/l in water, can be reduced to below 100 µg/l. The product purified water can be added to flowing surface waters without reservation. If the salt content is low it can be used as cooling water and, after biological purification, as drinking water. In addition, high service lives of the resin used herein are achieved since unavoidable sediments of inorganic deposits on the adsorber resin are removed by regularly washing with aqueous acid.

The following examples further explain the invention but are not limiting thereof.

EXAMPLE 1

In accordance with FIG. 1, raw groundwater having a pH of 7.1 is introduced to the solids filter F1 via line 1. The groundwater which exits from the filter via line 2 is free of suspended matter and contains 150 mg/l of chlorinated hydrocarbons (CHC) and 15 mg/l of aromatic hydrocarbons (AHC), and is passed into the adsorber F2 at 20° C. and a volumetric flowrate of 30 l/h. The adsorber has an internal diameter of 4 cm and a height of 150 cm and is packed with 1 kg of divinyl benzene/styrene copolymer having a specific surface area of 800 $m^2/g$ (PURASORB® AP 250 from Purolite, D-40882 Ratingen). Purified groundwater containing 80 µg/l of CHC and 10 µl of AHC is obtained via line 3.

After a running time of 50 hours, the groundwater feed to F2 is interrupted and steam at 130° C. is applied to the adsorber via line 4 in an amount which corresponds to 0.5% of the purified water having passed therethrough. The eluate flowing out via line 5 is separated in the phase separation vessel B1, the upper aqueous phase being returned via line 6 and the lower organic phase being discharged via line 7.

After 35 adsorption-desorption cycles, the adsorption bed is regenerated by adding 20 wt. % aqueous hydrochloric acid via line 8 to the adsorber which is at 70° C. and simultaneously introducing air via line 9 in countercurrent. The acid solution is let off via line 10.

EXAMPLE 2

The process as in Example 1 is followed with the difference that the raw groundwater has a pH of 4 prior to introduction to the solids filter. The purified groundwater in this case has the same quality as that of Example 1. However, regeneration with hydrochloric acid is only necessary after 60 cycles.

What is claimed as new and is desired to be secured by Letters Patent of the United States is:

1. A process for the purification of groundwater by removing aromatic hydrocarbons and halogenated hydrocarbons therefrom, comprising the steps of separating off solid constituents from said groundwater and then adsorbing said aromatic hydrocarbons and halogenated hydrocarbons to an adsorber resin, followed by desorbing the adsorbed aromatic hydrocarbons and halogenated hydrocarbons using steam and regenerating the adsorber resin using a 10 to 20 wt. % strength aqueous hydrochloric acid at 20° to 80° C.

2. The process according to claim 1, wherein the solid constituents are separated off from groundwater which has a pH of 1 to 8.

3. The process according to claim 1, wherein the adsorber resin is a divinylbenzene/styrene copolymer having a specific surface area of 600 to 1200 $m^2/g$.

4. The process according to claim 1, wherein the desorbing is carried out at 100° to 150° C.

* * * * *